United States Patent
Sato

(10) Patent No.: US 7,374,290 B2
(45) Date of Patent: May 20, 2008

(54) PROJECTION TYPE DISPLAY DEVICE

(75) Inventor: Yoshihisa Sato, Saitama (JP)

(73) Assignee: Sony Corporation (JP)

( * ) Notice: Subject to any disclaimer, the term of this patent is extended or adjusted under 35 U.S.C. 154(b) by 210 days.

(21) Appl. No.: 10/523,515

(22) PCT Filed: Jun. 9, 2004

(86) PCT No.: PCT/JP2004/008389

§ 371 (c)(1),
(2), (4) Date: Aug. 15, 2005

(87) PCT Pub. No.: WO2004/111724

PCT Pub. Date: Dec. 23, 2004

(65) Prior Publication Data

US 2006/0007409 A1    Jan. 12, 2006

(30) Foreign Application Priority Data

Jun. 13, 2003  (JP)  ............................. 2003-169788

(51) Int. Cl.
*G03B 21/14* (2006.01)
(52) U.S. Cl. ..................... 353/97; 353/121; 353/69
(58) Field of Classification Search ................. 353/88, 353/97, 65, 122, 121
See application file for complete search history.

(56) References Cited

U.S. PATENT DOCUMENTS

| | | | |
|---|---|---|---|
| 5,519,518 A * | 5/1996 | Watanabe et al. ............. | 349/57 |
| 6,854,851 B2 * | 2/2005 | Yamasaki et al. ............. | 353/97 |
| 6,877,865 B2 * | 4/2005 | English et al. ................ | 353/97 |
| 7,194,169 B2 * | 3/2007 | Ikeda et al. .................. | 385/115 |
| 7,207,679 B2 * | 4/2007 | Totani et al. .................. | 353/97 |
| 7,220,006 B2 * | 5/2007 | Allen et al. .................... | 353/85 |
| 2006/0244930 A1 * | 11/2006 | Hayashi et al. ............... | 353/97 |

FOREIGN PATENT DOCUMENTS

| | | |
|---|---|---|
| JP | 02-82178 U | 6/1990 |
| JP | 05-075960 A | 3/1993 |
| JP | 7-199183 A | 8/1995 |
| JP | 8-106090 A | 4/1996 |
| JP | 11-113019 A | 4/1999 |
| JP | 2002-303931 A | 10/2002 |
| JP | 2003-107422 A | 4/2003 |

* cited by examiner

*Primary Examiner*—William C. Dowling
(74) *Attorney, Agent, or Firm*—Lerner, David, Littenberg, Krumholz & Mentlik, LLP

(57) ABSTRACT

A projection-type display device includes a shielding unit and image signal correction units that divide the picture plane of the spatial light modulation element into a plurality of areas and perform correction on the image signal applied to the spatial light modulation element according to the current shielding amount of the shielding unit for each of the plurality of areas. Accordingly, appropriate uniformity correction is performed even when there is a change in the angular distribution of light emitted from the spatial light modulation element and reaching the screen.

4 Claims, 10 Drawing Sheets

PROJECTION TYPE DISPLAY DEVICE

TECHNICAL FIELD

This invention relates to a projection-type display device (projector), and in particular to a projection-type display device having diaphragm-like shielding means to improve contrast.

BACKGROUND ART

There has been widespread adoption of projection-type display devices, in which, in conformance to an electrical signal applied to a spatial light modulation element, light incident on the spatial light modulation element is spatially modulated and emitted, and the emitted light is condensed and projected to display an image. Such a projection-type display device conventionally has a lamp and condensing mirror as a light source, and also has an illumination optical system in which light emitted from the light source is condensed and made incident on the spatial light modulation element; and light from the spatial light modulation element is projected onto a screen or similar by a projection lens.

At present, representative spatial light modulation elements are those having internally a liquid crystal material, which by applying an electric field to the liquid crystals cause rotation of the oscillation direction of the incident polarized light (hereafter called the "liquid crystal type"), and those which have minute moveable mirrors for each pixel, and in which incident light is reflected by the minute moveable mirrors, with spatial modulation performed by changing the retention angles of the minute moveable mirrors according to the image signal (hereafter called the "DMD® (digital micromirror device) type").

FIG. 1 shows the basic configuration of a liquid crystal-type projection-type display device (liquid crystal projector). Light is emitted from a light source 21 toward a reflecting mirror 22. Much of the light is condensed at a liquid crystal element (liquid crystal panel) 25 which is the spatial light modulation element by the reflecting mirror 22 and an illumination optical system 23. The condensed light is made incident on a polarizer 24 before being incident on the liquid crystal element 25, to extract light polarized in one direction. Then, an image signal is applied to the liquid crystal element 25, so that the light emitted from the polarizer 24 and incident on the liquid crystal element 25 is spatially modulated, with the polarization direction rotated according to the image signal. Light leaving the liquid crystal element 25 is incident on an analyzer 26, and the light for projection is selected. Light emitted from the analyzer 26 is incident on a projection lens 27, and is projected to display an image on the screen (not shown).

Next, FIG. 2 shows the basic configuration of a DMD®-type projection-type display device (DMD® projector). Light is emitted from a light source 31 toward a reflecting mirror 32. Much of the light is condensed at the DMD® element (DMD® panel) 34, which is the spatial light modulation element, by the reflecting mirror 32 and an illumination optical system 33. An image signal is applied to the DMD® element 34, the incident light is spatially modulated, the inclinations of the minute movable mirrors are changed according to the image signal, and the emission direction of light is changed. Light selected by the DMD® element 34 is incident on a projection lens 35, and is projected onto a screen (not shown) to display an image.

However, in comparisons of the images displayed by projection-type display devices with those of other image display devices, the low contrast of images displayed by projection-type display devices is noted. Here "contrast" means the brightness ratio when a white screen is displayed and when a black screen is displayed.

As shown in FIGS. 1 and 2, even if a projection-type display device is used to display a black screen, a portion of the light, albeit a small amount, is incident on the projection lens. This is because the light source is always being operated.

As a measure to resolve the above inconvenience, in recent years diaphragms have been provided in the illumination optical system or at the projection lens in projection-type display devices (refer to for example Japanese Published Patent Application No. 2001-264728 (paragraphs 0049 to 0054 and FIG. 1)).

The improvement in contrast when an aperture is provided is due to the following reason. In the case of a liquid crystal projector, a characteristic of liquid crystal elements is that the larger the angle of incidence on the liquid crystal panel surface, the greater the degradation in contrast. Consequently in the liquid crystal projector shown in FIG. 1, by providing a diaphragm 41 within the illumination optical system 23 or in proximity to the illumination optical system 23 as shown in FIG. 3, the angle of rays incident on the liquid crystal element 25 can be decreased, so that contrast is improved.

Alternatively, by providing a diaphragm 41 within the projection lens 27 in the liquid crystal projector of FIG. 1, as shown in FIG. 4, so that those rays emitted from the liquid crystal element 25 that are incident on the liquid crystal panel at large angles are blocked by the diaphragm 41, and contrast is improved.

In the case of a DMD® projector, on the other hand, as explained above, when a black screen is displayed the light incident on the DMD® element is caused not to be incident on the projection lens. However, because a DMD® element is an aggregation of minute mirrors, light scattering occurs among the mirrors. Accordingly, there exists some light which ordinarily should not be directed toward the projection lens but is in fact incident on the projection lens. In order to prevent this light from actually being projected insofar as possible, a diaphragm may be provided in the projection lens, so that contrast can be improved.

As explained above, there have been conventional projection-type display devices in which contrast has been improved by installing a diaphragm. However, there is also the inconvenience that use of a diaphragm which blocks a fixed amount of light (for example, an aperture diaphragm with fixed aperture shape) results in a decrease in brightness when displaying a white screen.

As a method for avoiding this inconvenience, a variable diaphragm (diaphragm capable of varying the amount of light to be blocked) may be used, enabling a plurality of states when opening the diaphragm and when blocking light. The problem with contrast in a projected image is due to the brightness of the projection environment. In a bright room, the room brightness (room illumination, sunlight and similar) causes light to be incident on the screen regardless of whether a projection-type display device is present. Hence even if a black screen is displayed, because of outside light, fading of black portions due to the device does not become a problem. White screen brightness exceeds the outside light is necessary.

Conversely, in the case where there is no outside light, fading of a black screen becomes prominent. On the other hand, because the area is dark, brightness in a white screen is not as necessary. This is because human eyes adjust to the brightness.

Hence in an environment in which there is outside light, the diaphragm is opened, white colors are made brighter, and a high-brightness image is presented. On the other hand, in an environment with no outside light, the diaphragm is closed, white is suppressed, and contrast is increased. In this way, by using a variable diaphragm, a balance between brightness and contrast can be achieved.

However, when a variable diaphragm is opened and closed in this way, the angular distribution of light emitted from the spatial light modulation element and arriving at the screen is different when the diaphragm is opened and when it is closed. This is because, as explained above, a portion of the light incident on the spatial light modulation element and a portion of the light emitted from the spatial light modulator is blocked and prevented from reaching the screen. This is the means of increasing the contrast, but as a consequence the following problems may arise.

In a liquid crystal element, the thickness of the portion into which liquid crystals are sealed (the liquid crystal layer) may not be uniform. Even if a voltage at the same level were applied to all the pixels in a liquid crystal panel, because the thickness of the liquid crystal layer differs in different areas, the incident light may not be optically modulated to the same extent. In other words, in the same liquid crystal panel, the graph relating the applied voltage (V) to the transmittance (T) (the VT curve) may not be the same depending on the area of the effective picture plane.

In this state, appropriate light modulation is not possible depending on the location in the picture plane, so that differences arise between the applied image signal and the projected image. For example, even in a case in which an image signal is input at a level corresponding to a transmittance of 50%, the transmittance is not 50% for all locations of the picture plane, so that brightness is uneven in the projected image.

In order to alleviate this brightness unevenness, this applicant has disclosed technology, in Japanese Published Patent Application No. H11-113019, to divide the picture plane of a liquid crystal panel into a plurality of areas, and to perform correction on the image signal applied to the liquid crystal panel according to the VT curve characteristics and similar with respect to each of these areas (hereafter called "uniformity correction technology").

However, even at the same location in the picture plane, the VT curve changes with the angular distribution of light incident on the liquid crystal panel. Consequently if there are changes, due to opening and closing of the variable diaphragm, in the angular distribution of light reaching the screen after emission from the liquid crystal panel (if opening and closing of a variable diaphragm on the illumination optical system side cause changes in the angular distribution of light incident on the liquid crystal panel, or opening and closing of a variable diaphragm on the projection lens side cause changes in the angular distribution of light projected from the projection lens at the time of incidence on the liquid crystal panel), then even when using such uniformity correction technology, appropriate correction cannot be performed, and brightness unevenness occurs in the projected image.

In the above, cases have been explained in which by opening and closing a variable diaphragm, the angular distribution of light emitted from a liquid crystal panel and reaching a screen changes; however, in addition to the above, reasons for a change in the angular distribution of light emitted from a liquid crystal panel and reaching a screen may include cases in which the zoom position of a projection lens comprising a zoom lens, with variable focal length, is changed, and cases in which the liquid projector has a projection lens which can be replaced, and the projection lens is replaced with a lens having a different f number.

In light of the above, an object of this invention is to provide a projection-type display device which can perform appropriate uniformity correction even in cases when the angular distribution of light emitted from the spatial light modulation element and reaching the screen changes.

DISCLOSURE OF THE INVENTION

In order to achieve this object, the applicant proposes a projection-type display device, including a light source; a spatial light modulation element which modulates incident light according to an applied image signal and emits the modulated light; an illumination optical system which condenses light from the light source and illuminates the spatial light modulation element; a projection lens which projects light emitted from the spatial light modulation element; shielding means, positioned along the path of light on the side of either the illumination optical system or the projection lens with respect to the spatial light modulation element, and which varies the amount of shielding of transmitted light; and image signal correction means which divides the picture plane of the spatial light modulation element into a plurality of areas, and performs correction on the image signal applied to the spatial light modulation element according to the current shielding amount of the shielding means for each of the plurality of areas.

In this projection-type display device (a first projection-type display device of this invention), the shielding amount of the shielding means is reduced in an environment with outside light, so that white is made bright and a high-brightness image can be presented, and the shielding amount of the shielding means is increased in an environment with no outside light, so that white is suppressed and contrast can be improved, and consequently a balance can be achieved between brightness and contrast.

Further, this projection-type display device includes image signal correction means to perform correction on the image signal applied to the spatial light modulation element, according to the current shielding amount of the shielding means, for each of the plurality of areas into which the picture plane of the spatial light modulation element is divided. Hence different correction is performed according to changes in the shielding amount of the shielding means, even for image signals at the same location of the picture plane of the spatial light modulation element.

In this way, correction of the image signal is performed which differs depending on changes in the shielding amount of the shielding means, even for an image signal at the same location of the picture plane of the spatial light modulation element; hence even if there is a change in the angular distribution of light emitted from the spatial light modulation element and reaching the screen due to changes in the shielding amount of the shielding means, appropriate uniformity correction can be performed.

In one example, it is preferable that in this projection-type display device the image signal correction means perform correction, for each area, according to the characteristic of the light output level for an area with respect to the level of application of the image signal and to the current shielding amount of the shielding means.

By this means, even in the case where the characteristic of the spatial light modulation element is different depending on the area and moreover varies according to the angular distribution of light incident on the spatial light modulation element changes, appropriate uniformity correction can be performed.

In one example, it is preferable that this projection-type display device further includes storage means to store a plurality of correction data sets according to the shielding amount of the shielding means, and that the image signal correction means perform correction according to the current shielding amount of the shielding means, referring to correction data from the storage means.

As a result, appropriate uniformity correction according to changes in the shielding amount of the shielding means can be performed even more quickly than in cases in which correction data is obtained by computation according to the current shielding amount of the shielding means.

Next, the applicant of the present invention proposes a projection-type display device including a light source; a spatial light modulation element which modulates incident light according to an applied image signal, and emits the modulated light; an illumination optical system which condenses light from the light source and illuminates the spatial light modulation element; a projection lens including a zoom lens which projects the light emitted from the spatial light modulation element; and image signal correction means which divides the picture plane of the spatial light modulation element into a plurality of areas, and performs correction on the image signal applied to the spatial light modulation element, for each of the divided areas, according to the f number at the current zoom position of the projection lens.

This projection-type display device (a second projection-type display device of this invention) includes image signal correction means which performs correction on the image signal applied to the spatial light modulation element, for each of the plurality of areas into which the picture plane of the spatial light modulation element is divided, according to the f number at the current zoom position of the projection lens including a zoom lens. Hence different correction of the image signal at the same location in the picture plane of the spatial light modulation element is performed, according to the zoom position of the projection lens.

In this way, different correction of the image signal is performed even at the same location in the picture plane of the spatial light modulation element, depending on the zoom position of the projection lens, so that appropriate uniformity correction can be performed even in the case where there are changes in the angular distribution of light emitted from the spatial light modulation element and reaching the screen due to changes in the projection lens zoom position.

In one example, it is preferable that in this projection-type display device the image signal correction means perform correction, for each divided area, according to the characteristic of the light output level in the area with respect to the image signal application level, and according to the f number at the current zoom position of the projection lens.

By this means, even in the case where the characteristics of the spatial light modulation element differ for different areas and also change depending on the angular distribution of light incident on the spatial light modulation element, appropriate uniformity correction can be performed.

In one example, it is preferable that this projection-type display device further include storage means to store a plurality of correction data sets according to the f number of the projection lens, and that the image signal correction means perform correction according to f number at the current zoom position of the projection lens, referring to correction data from the storage means.

As a result, appropriate uniformity correction according to changes in the zoom position of the projection lens can be performed more quickly than by computation of correction data according to the f number at the current zoom position of the projection lens.

Further, in one example, it is preferable that this projection-type display device further include judgment means to judge the current zoom position of the projection lens, so that the image signal correction means performs correction according to the f number at the current zoom position of the projection lens, based on the judgment result of the judgment means.

As a result, appropriate uniformity correction can be performed automatically according to changes in the zoom position of the projection lens.

Next, the applicant of the present invention proposes a projection-type display device including: a light source; a spatial light modulation element which modulates incident light according to an applied image signal, and emits the modulated light; and an illumination optical system which condenses light from the light source and illuminates the spatial light modulation element; in which a projection lens which projects light emitted from the spatial light modulation element can be replaced with a plurality of different types of projection lenses with different f numbers; and further including image signal correction means which divides the picture plane of the spatial light modulation element into a plurality of areas, and performs correction on the image signal applied to the spatial light modulation element, for each of these areas, according to the f number of the currently mounted projection lens.

This projection-type display device (a third projection-type display device of this invention) includes image signal correction means which performs correction on the image signal applied to the spatial light modulation element, for each area of the plurality of areas into which the picture plane of the spatial light modulation element is divided, according to the f number of the projection lens currently mounted among a plurality of projection lenses with different f numbers. Hence an image signal at the same location in the picture plane of the spatial light modulation element is corrected differently according to the f number of the mounted projection lens.

In this way, correction is performed differently, depending on the f number of the currently mounted projection lens, even for image signals at the same location of the spatial light modulation element, so that appropriate uniformity correction can be performed even if there is a change in the angular distribution of light emitted from the spatial light modulation element and reaching the screen due to replacement of the projection lens with a projection lens having a different f number.

Further in one example, it is preferable that in this projection-type display device the image signal correction means performs correction, for each area, according to the characteristic of the light output level for the area with respect to the image signal application level, and to the f number of the currently mounted projection lens.

By this means, even in the case where the characteristics of the spatial light modulation element are different for different areas, and also change due to the angular distribution of light incident on the spatial light modulation element, appropriate uniformity correction can be performed.

In one example, it is preferable that this projection-type display device further include storage means which stores a plurality of correction data sets according to the f numbers of a plurality of types of projection lens, and that the image signal correction means performs correction referring to the correction data from the storage means, according to the f number of the currently mounted projection lens.

As a result, appropriate uniformity correction according to the projection lens replacement can be performed more quickly than by computation of correction data according to the f number of the currently mounted projection lens.

Further in one example, it is preferable that this projection-type display device further include judgment means to judge the f number of the currently mounted projection lens, and that the image signal correction means perform correction according to the f number of the currently mounted projection lens, based on the judgment result of the judgment means.

By this means, appropriate uniformity correction can be performed automatically according to replacement of the projection lens.

In one example, it is preferable that in this projection-type display device, the image signal correction means perform correction referring to correction data from individual correction data storage means, possessed by the currently mounted projection lens, which stores correction data to perform individual correction corresponding to the projection lens.

Also preferred is a projection-type display device further including standard correction data storage means which stores correction data according to the f number of a projection lens serving as a standard, and wherein the image signal correction means references standard correction data from this standard correction data storage means, and differential data is referenced to perform correction from the individual correction data storage means, possessed by the currently mounted projection lens, which stores differential data with respect to this standard correction data in order to perform individual correction corresponding to the projection lens.

As a result, appropriate uniformity correction can be performed according to projection lens replacement, without requiring the storage of numerous correction data sets in the projection-type display device main unit, even in the cases where there are numerous types of replaceable projection lenses.

BEST MODE OF CARRYING OUT THE INVENTION

Figure 1:
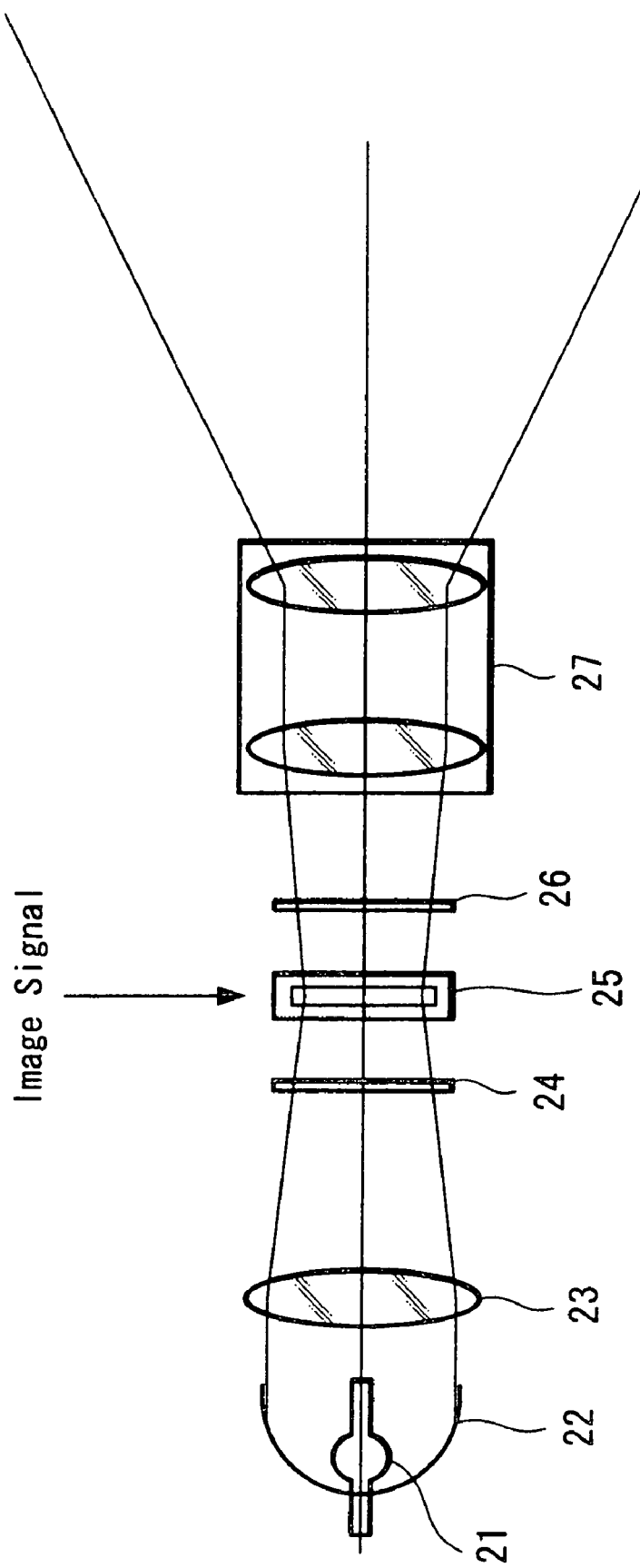
FIG. 1 shows the basic configuration of a liquid crystal projector.
Figure 2:
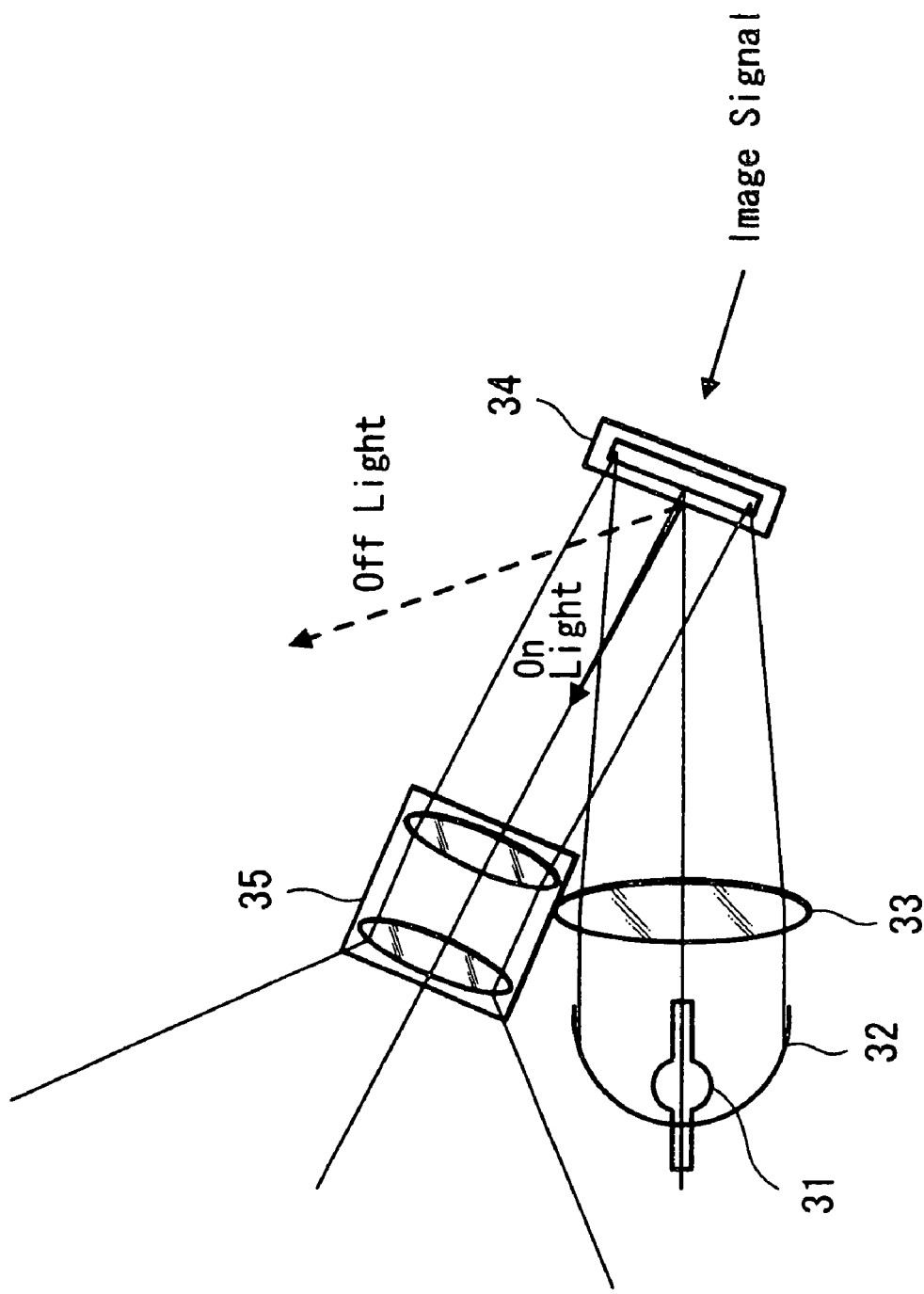
FIG. 2 shows the basic configuration of a DMD® projector.
Figure 3:
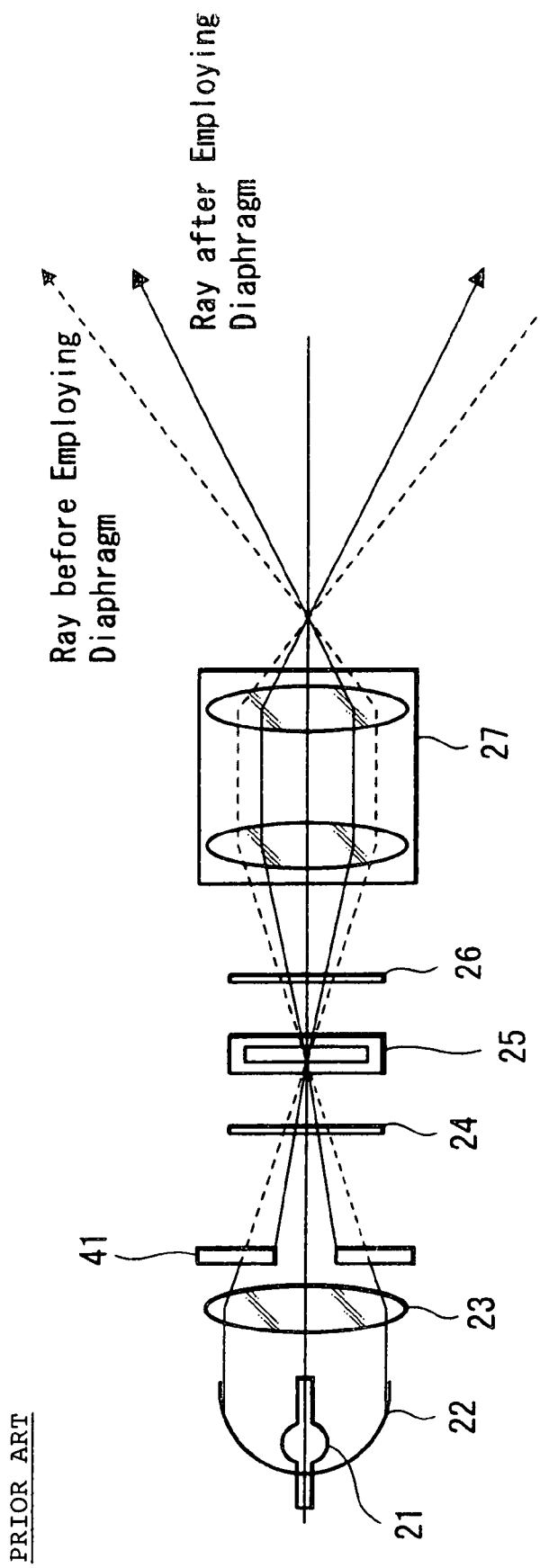
FIG. 3 shows a conventional liquid crystal projector provided with a diaphragm.
Figure 4:
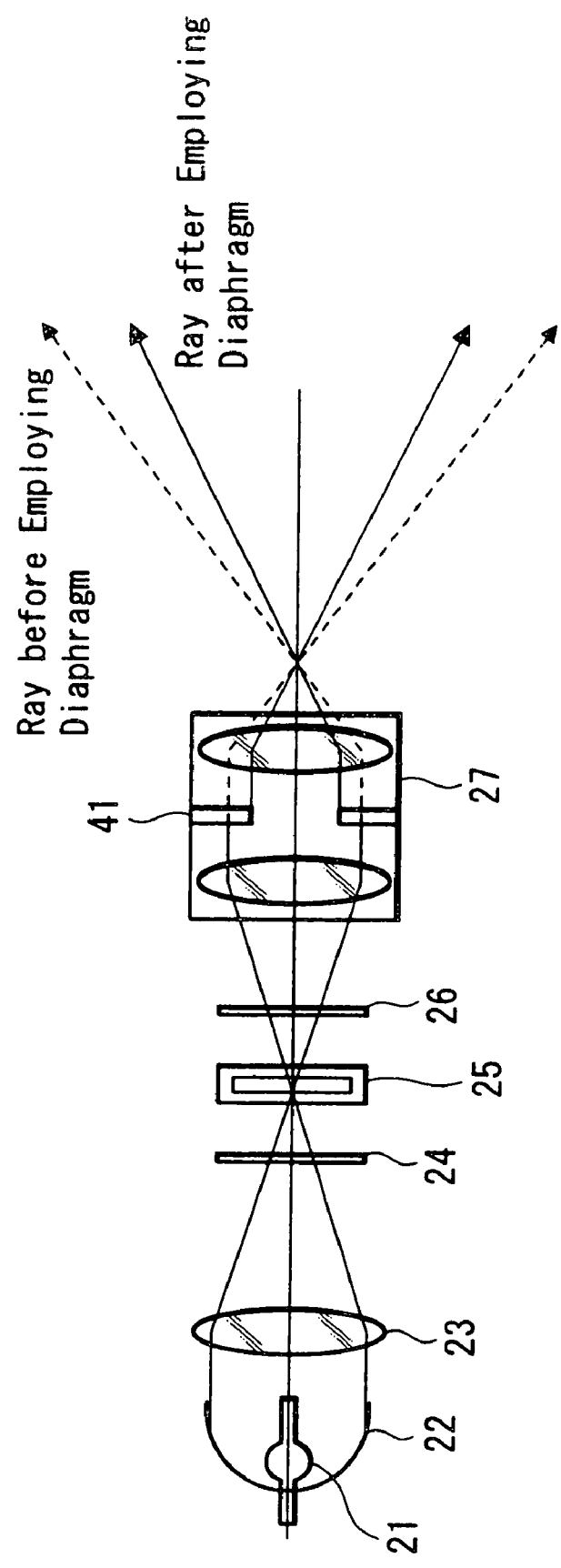
FIG. 4 shows a conventional liquid crystal projector provided with a diaphragm.
Figure 5:
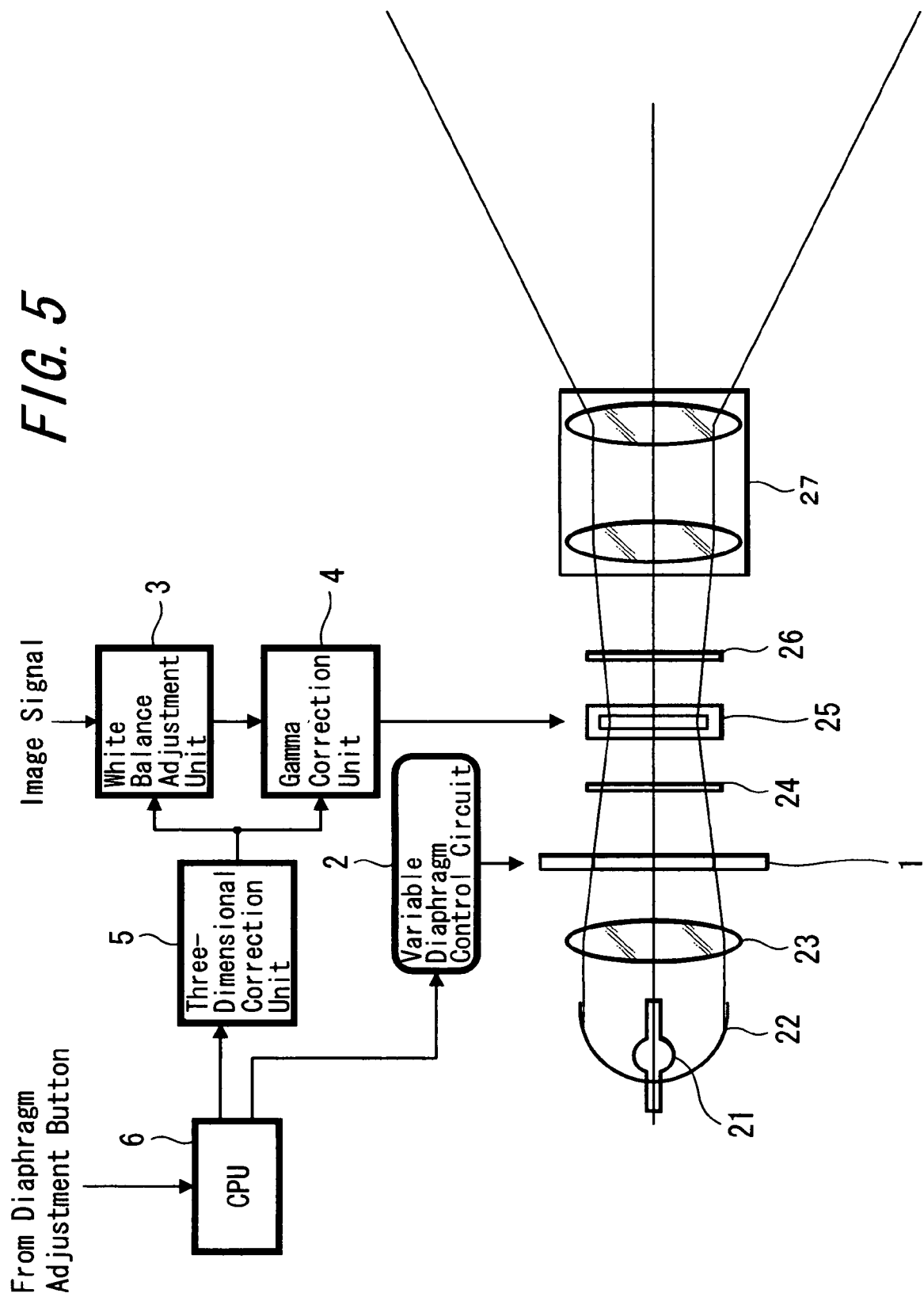
FIG. 5 shows an example of the configuration of a liquid crystal projector to which this invention is applied.

Hereinafter, this invention is explained in detail using the drawings. FIG. 5 shows an example of the configuration of a liquid crystal projector to which this invention is applied; units common to FIG. 1 are assigned the same symbols. Light is emitted from the light source 21 toward the reflecting mirror 22, Much of the light is collected at the liquid crystal element (liquid crystal panel) 25, which is the spatial light modulation element, by the reflecting mirror 22 and illumination optical system 23.

A variable diaphragm 1 is positioned in the vicinity of the illumination optical system 23. The variable diaphragm 1 is a mechanical shutter in which the area of the aperture portion can be changed; the area of this aperture portion is increased and decreased by a variable-diaphragm driving unit 2 (a motor which displaces the operating unit of the variable diaphragm 1, and a motor driver or similar which drives the motor).

Light collected by the reflecting mirror 22 and illumination optical system 23 passes through this variable diaphragm 1 and is incident on the polarizer 24, to extract light polarized in one direction, before being incident on the liquid crystal element 25. An image signal is applied to the liquid crystal element 25, and light emitted from the polarizer 24 and which is incident on the liquid crystal element 25 is spatially modulated, with the polarization direction rotated according to the image signal. Light leaving the liquid crystal element 25 is incident on the analyzer 26, and light to be projected is selected. Light emitted from the analyzer 26 is incident on the projection lens 27, and is projected onto a screen (not shown) or similar to display an image.

An operation panel on the main unit and a remote controller of this liquid crystal projector are not shown in the drawings, but a diaphragm adjustment button is provided to perform opening and closing operation of the variable diaphragm 1 (performing adjustment to make the area of the aperture portion large or small, in two stages). A CPU 6 controls each unit within the liquid crystal projector; in the case where an operation is performed using the diaphragm adjustment button to open the variable diaphragm 1, the variable-diaphragm driving unit 2 is controlled to widen the variable diaphragm 1 (maximize the area of the aperture portion), and on the other hand in the case where an operation is performed to close the variable diaphragm 1 using the diaphragm adjustment button, the variable-diaphragm driving unit 2 is controlled to narrow the variable diaphragm 1 (reduce the area of the aperture portion compared with the maximum area).

The image signal applied to the liquid crystal element 25 is corrected by a white balance adjustment unit 3 and a gamma correction unit 4. The white balance adjustment unit 3 adjusts the color temperature of the image signal, and though omitted from the drawings, includes a gain circuit to adjust the color temperature on the white side of the image signal, and a bias circuit to adjust the color temperature on the black side of the image signal. The gamma correction unit 4 performs gamma correction on the image signal from the white balance adjustment unit 3 to adjust the image quality; though omitted from the drawings, a lookup table is provided which stores characteristic curve data which is the opposite of the VT curve characteristics of conventional liquid crystal elements.

Figure 6:
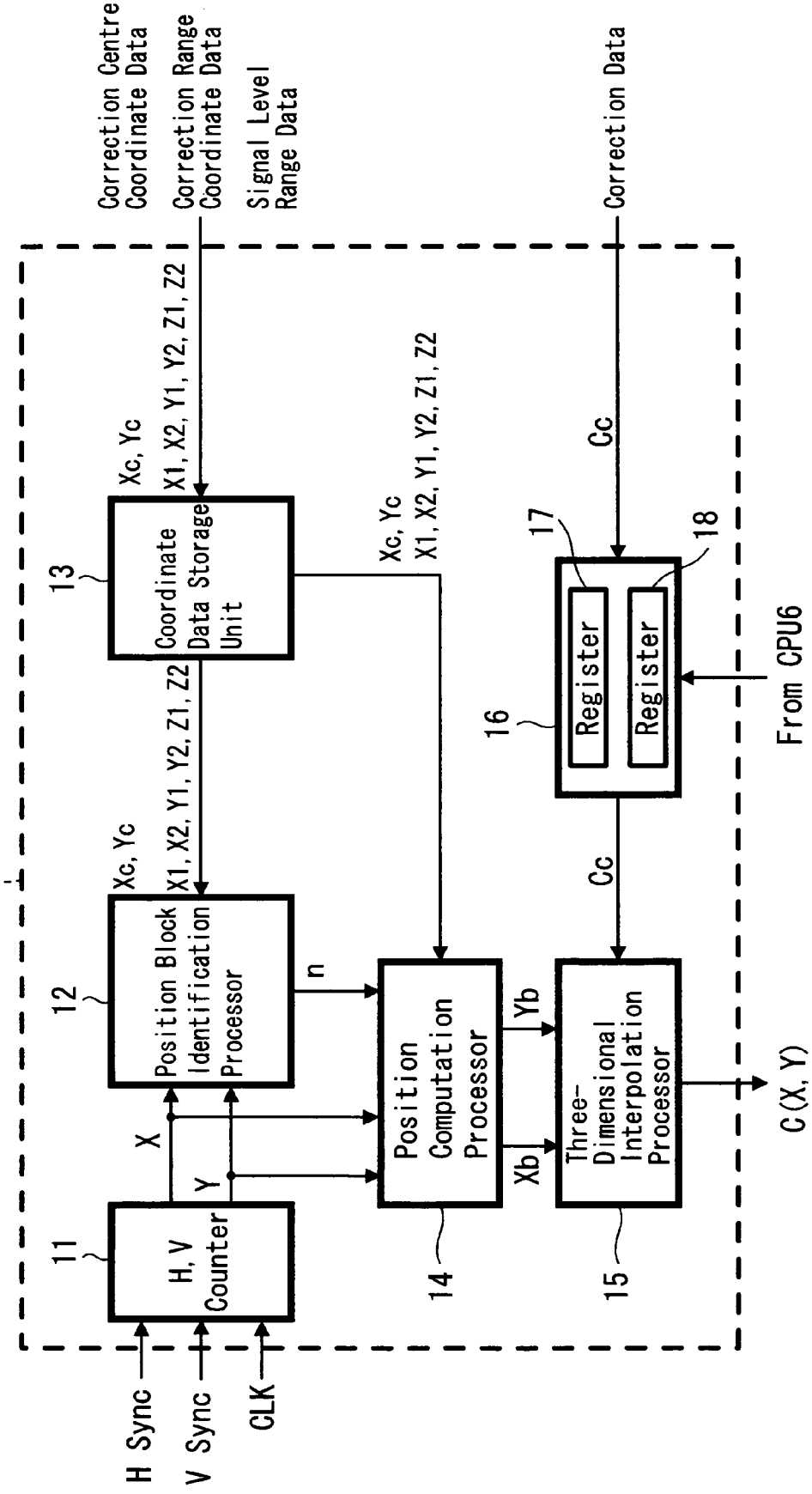
FIG. 6 is a block diagram showing an example of the configuration of the three-dimensional correction unit of FIG. 5.

The three-dimensional correction unit 5 supplies, to the white balance adjustment unit 3 and gamma correction unit 4, three-dimensional interpolation data C (X, Y, Z) for the level Z image signal at an arbitrary pixel G (X, Y) of the liquid crystal element 25, and as shown in FIG. 6, includes a horizontal/vertical synchronization counter 11, position block identification processor 12, coordinate data storage unit 13, position computation processor 14, three-dimensional interpolation processor 15, and correction data storage unit 16.

The horizontal/vertical synchronization counter 11 is a counter which identifies the plane coordinates (X, Y) of a pixel when a pixel (signal) for correction processing is seen as a position in the display screen, that is, when the display screen is seen as a plane; the horizontal position coordinate X output from this horizontal/vertical synchronization counter 11 is zero-reset in sync with the horizontal synchronization signal Hsync, and is incremented at each clock signal CLK, to serve as coordinate data representing the horizontal-direction position of a pixel. The vertical position coordinate Y output from the horizontal/vertical synchronization counter 11 is zero-reset in sync with the vertical synchronization signal Vsync, and is incremented at each horizontal synchronization signal Hsync, to serve as coordinate data representing the vertical-direction pixel position. The clock signal CLK is synchronized with changes on the time axis, and is conventionally referred to as a dot clock.

The coordinate data storage unit 13 is provided with a register to store correction center coordinate data (coordinate data for the center point for correction in the picture plane of the liquid crystal element 25) Xc, Yc; correction range coordinate data (coordinate data for the vertices of the range over which correction is necessary in the picture plane of the liquid crystal element 25) X1, X2, Y1, Y2; and data Z1, Z2 for the range of image signal levels over which correction will extend. At the time of factory adjustment or similar occasion, this register stores correction center coordinate data and correction range coordinate data, input in advance from an external device.

The coordinates X, Y of the pixel G(X, Y) are supplied by the horizontal/vertical synchronization counter 11 to the position block identification processor 12, and data stored in the coordinate data storage unit 13 is supplied; and the range over which correction is necessary is further divided into a plurality of position blocks.

The position computation processor 14 judges at which address and in which position block a pixel G(X, Y) is positioned from the coordinates X, Y of the pixel G(X, Y) supplied from the horizontal/vertical synchronization counter 11, the data stored in the coordinate data storage unit 13, and from the suffix n identifying the position block supplied by the position block identification processor 12, and outputs the judgment result as the address data Xb, Yb. The correction data storage unit 16 is provided with a register to store correction data Cc (Xc, Yc, Zc) at the correction center coordinate Gc, and similar.

The three-dimensional interpolation processor 15 interpolates the output levels for level Z applied image signals at arbitrary coordinates G(X, Y), based on address data Xb, Yb from the position computation processor 14 and the correction data Cc stored in the correction data storage unit 16, to create three-dimensional interpolation data C(X, Y, Z). This three-dimensional interpolation data C(X, Y, Z) is supplied to the white balance adjustment unit 3 and gamma correction unit 4.

The detailed configuration and operation of those white balance adjustment unit 3, gamma correction unit 4, and three-dimensional correction unit 5 are described in Japanese Published Patent Application No. 11-113019, filed by this applicant; by means of these units, the picture plane of the liquid crystal element 25 is divided into a plurality of areas, and uniformity correction (white balance adjustment and gamma correction) can be applied to the image signal applied to the liquid crystal element 25, according to the VT curve characteristic for each area and to the level of the image signal.

However, as shown in FIG. 6, two registers storing correction data Cc are provided in the correction data storage unit 16 of the three-dimensional correction unit 5: a register 17 to store correction data Cc used when the variable diaphragm 1 is opened, and a register 18 to store correction data Cc used when the variable diaphragm 1 is closed.

At the time when adjusting the liquid crystal projector at the factory, color unevenness and brightness unevenness in the projected image when the variable diaphragm 1 is open, and color unevenness and brightness unevenness in the projected image when the variable diaphragm 1 is closed, are measured respectively; correction data Cc (according to the VT curve characteristics for each area of the picture plane of the liquid crystal element 25, corresponding to the angular distribution of light incident on the liquid crystal element 25 with the variable diaphragm 1 in the open state), to compensate for color unevenness and brightness unevenness when the variable diaphragm 1 is open, is stored in the register 17; and correction data Cc (according to the VT curve characteristics for each area of the picture plane of the liquid crystal element 25, corresponding to the angular distribution of light incident on the liquid crystal element 25 with the variable diaphragm 1 in the closed state), to compensate for color unevenness and brightness unevenness when the variable diaphragm 1 is closed, is stored in the register 18.

In the case where operation is performed to open the variable aperture 1 using the above-described diaphragm adjustment button, the CPU 6 controls the three-dimensional correction unit 5 and causes the three-dimensional interpolation processor 15 to refer to the interpolation data Cc in the register 17 among the registers 17, 18 in the correction data storage unit 16; on the other hand, in the case where operation is performed to close the variable aperture 1 using the above-described diaphragm adjustment button, the CPU 6 controls the three-dimensional correction unit 5 and causes the three-dimensional interpolation processor 15 to refer to the interpolation data Cc in the register 18 among the registers 17, 18 in the correction data storage unit 16.

Next, operation of the liquid crystal projector is explained.

When using the liquid crystal projector in an environment with outside light, the user employs the above-described diaphragm adjustment button to perform an operation to open the variable diaphragm 1. Under control by the CPU 6, the area of the aperture portion of the variable diaphragm 1 is maximized, so that the shielding amount by the variable diaphragm 1 is reduced, white is made brighter, and a high-brightness image can be displayed.

On the other hand, when using the liquid crystal projector in an environment with no outside light, the user employs the above-described diaphragm adjustment button to perform an operation to close the variable diaphragm 1. Under control by the CPU 6, the area of the aperture portion of the variable diaphragm 1 is reduced, so that the shielding amount by the variable diaphragm 1 is increased, white is suppressed, and contrast is increased. By this means, a balance between brightness and contrast is achieved.

When the variable diaphragm 1 is opened, three-dimensional interpolation data C(X, Y, Z), obtained under control of the CPU 6 based on correction data Cc (correction data to compensate for color unevenness and brightness unevenness in a projected image when the variable diaphragm 1 is open) in the register 17 of the correction data storage unit 16, is supplied to the white balance adjustment unit 3 and gamma correction unit 4 from the three-dimensional correction unit 5. By this means, uniformity correction (white balance adjustment and gamma correction) are performed on the image signal applied to the liquid crystal element 25 in the white balance adjustment unit 3 and gamma correction unit 4, to compensate for color unevenness and brightness unevenness in the projected image when the variable diaphragm 1 is open.

On the other hand, when the variable diaphragm 1 is closed, three-dimensional interpolation data C(X, Y, Z), obtained under control of the CPU 6 based on correction data Cc (correction data to compensate for color unevenness and brightness unevenness in a projected image when the variable diaphragm 1 is closed) in the register 18 of the correction data storage unit 16, is supplied to the white balance adjustment unit 3 and gamma correction unit 4 from the three-dimensional correction unit 5. By this means, uniformity correction (white balance adjustment and gamma correction) are performed on the image signal applied to the liquid crystal element 25 in the white balance adjustment unit 3 and gamma correction unit 4, to compensate for color unevenness and brightness unevenness in the projected image when the variable diaphragm 1 is closed.

By thus performing correction on the image signal which differs, according to whether the variable diaphragm 1 is open or closed, even for the same level at the same location in the picture plane of the liquid crystal element 25 in the liquid crystal projector, appropriate uniformity correction can be performed even when there is a change in the angular distribution of light emitted from the liquid crystal element 25 and reaching the screen, according to the open or closed state of the variable diaphragm 1.

Further, registers 17 and 18, storing two sets of correction data Cc each corresponding to characteristic of each area of the picture plane of the liquid crystal element 25 according to whether the variable diaphragm 1 is open or closed, are provided in the correction data storage unit 16 of the three-dimensional correction unit 5, so that appropriate uniformity correction according to the open or closed state of the variable diaphragm 1 can be performed more quickly than in the case where correction data Cc is computed according to the current open or closed state of the variable diaphragm 1.

Figure 7:
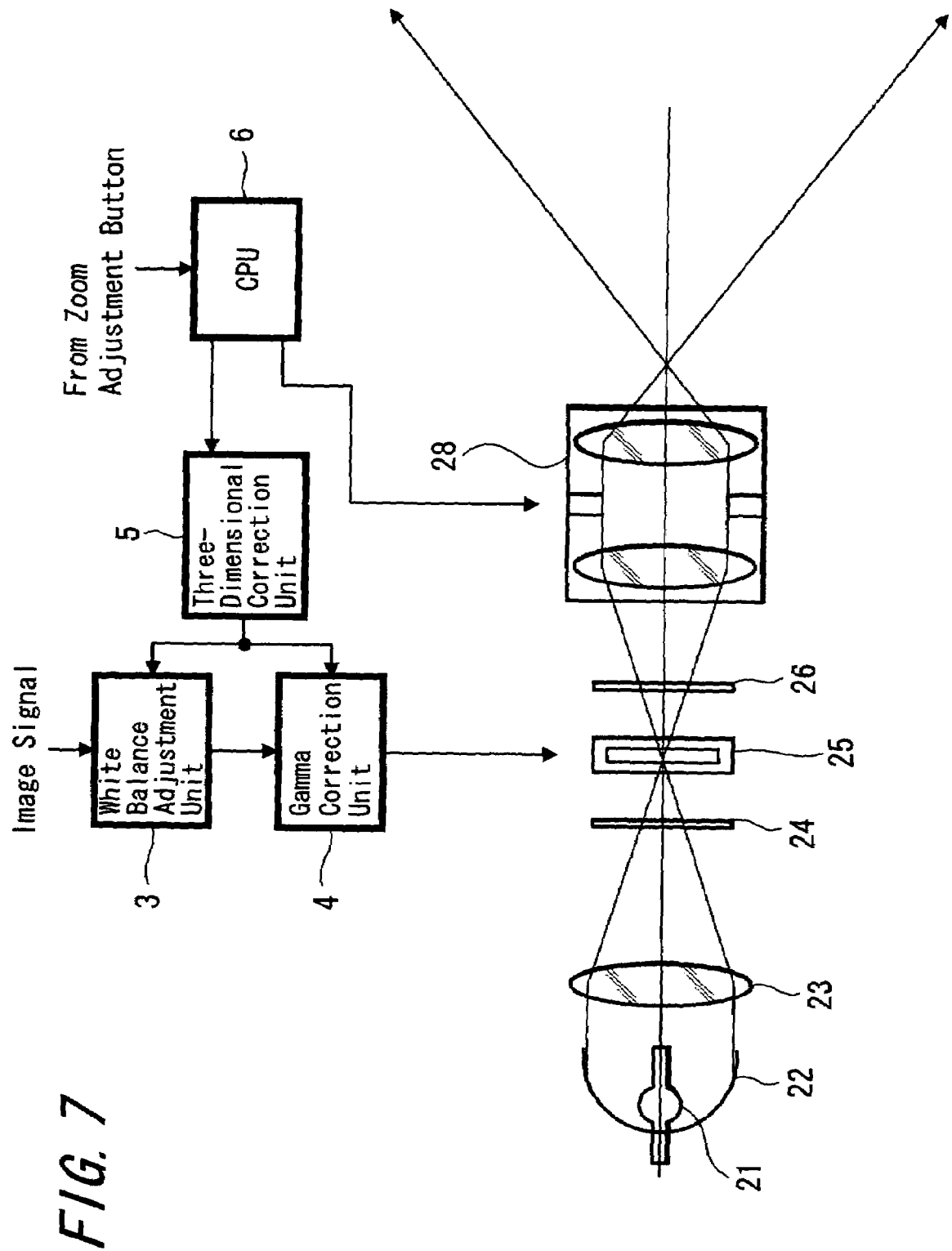
FIG. 7 shows an example of the configuration of another liquid crystal projector to which this invention is applied.

Next, FIG. 7 shows an example of the configuration of another liquid crystal projector to which this invention is applied; units common to FIGS. 1, 5 and 6 are assigned the same symbols. This liquid crystal projector is not provided with a variable diaphragm, but has a projection lens 28 including zoom lenses with f numbers from 1.85 to 2.2.

Though not shown in the drawings, the operation panel or remote controller of this liquid crystal projector is provided with a zoom adjustment button to perform operations to adjust the zoom position of the projection lens 28. Based on operation of this zoom adjustment button, the CPU 6 controls the zoom position of the projection lens 28.

Figure 8:
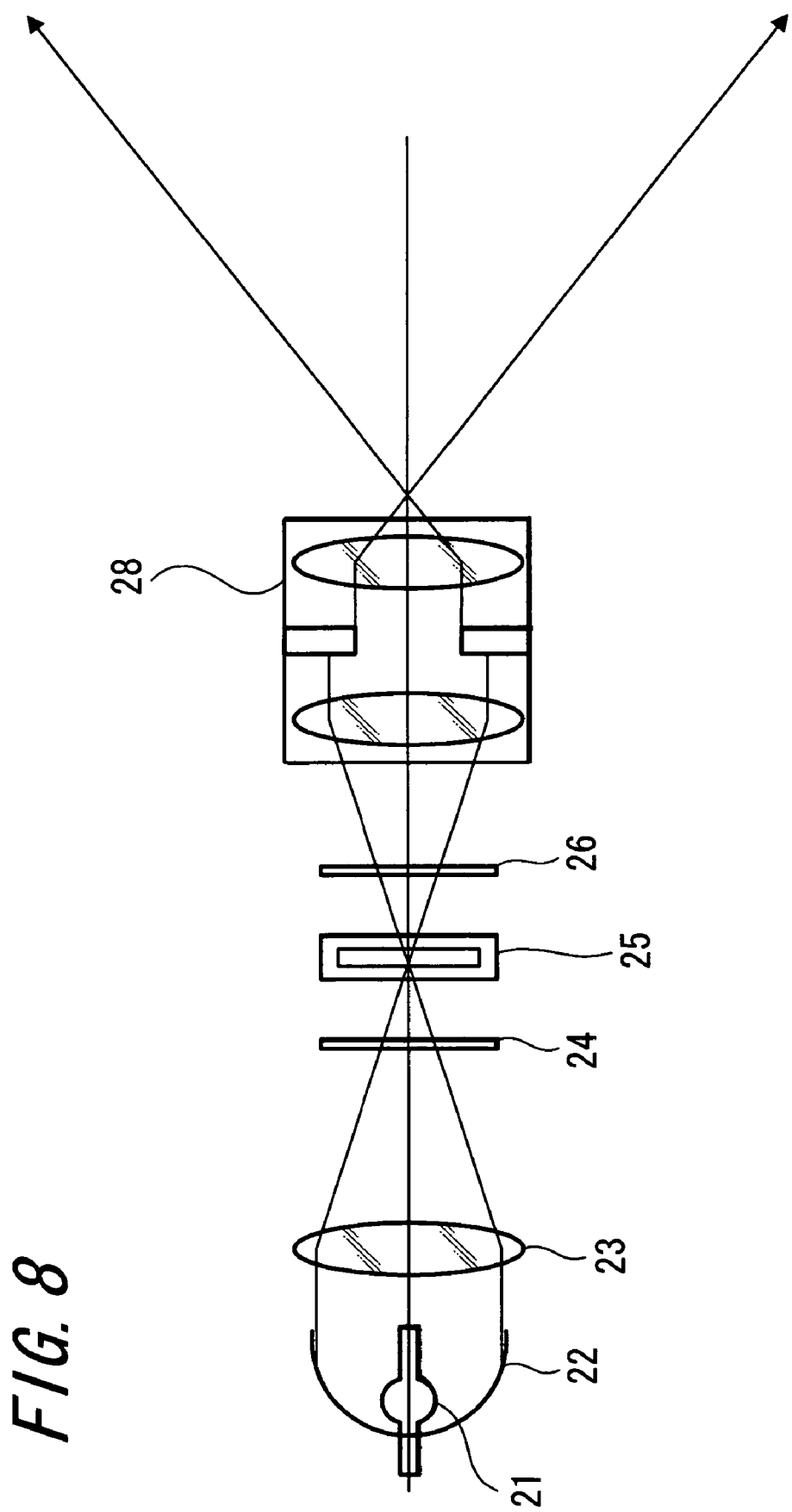
FIG. 8 shows a change in the zoom position of the liquid crystal projector of FIG. 7.

In FIG. 7, a state in which the zoom position of the projection lens 28 is on the broad-angle side (a state in which the f number is 1.85) is shown. FIG. 8 shows a state in which the zoom position of the projection lens 28 is on the telephoto side (a state in which the f number is 2.2) (in FIG. 8, the white balance adjustment unit 3, gamma correction unit 4, three-dimensional correction unit 5, and CPU 6 are omitted). As is shown in those drawings also, the angular distribution of light emitted from the liquid crystal element 25 and reaching the screen changes according to changes in the zoom position of the projection lens 28.

When this liquid crystal projector is adjusted at the factory, color unevenness and brightness unevenness in the projected image in the state in which the zoom position of the projection lens 28 is on the broad-angle side (the state of FIG. 7), and color unevenness and brightness unevenness in the projected image in the state in which the zoom position of the projection lens 28 is on the telephoto side (the state of FIG. 8), are each measured; correction data Cc to compensate for color unevenness and brightness unevenness when the zoom position of the projection lens 28 is on the broad-angle side (according to the VT curve characteristics in each area of the picture plane of the liquid crystal element 25, corresponding to the incident angle distribution when light to be projected from the projection lens 28 is incident on the liquid crystal element 25 in the state in which the zoom position of the projection lens 28 is on the broad-angle side) is stored in the register 17 (FIG. 6) of the correction data storage unit 16 of the three-dimensional correction unit 5; and correction data Cc to compensate for color unevenness and brightness unevenness when the zoom position of the projection lens 28 is on the telephoto side (according to the VT curve characteristics in each area of the picture plane of the liquid crystal element 25, corresponding to the incident angle distribution when light to be projected from the projection lens 28 is incident on the liquid crystal element 25 in the state in which the zoom position of the projection lens 28 is on the telephoto side) is stored in the register 18.

When operation is performed using the above-described zoom adjustment button to move the zoom position of the projection lens 28 to the broad-angle side, the CPU 6 controls the three-dimensional correction unit 5 to cause the three-dimensional interpolation processor 15 to refer to the correction data Cc in register 17 among the registers 17 and 18 of the correction data storage unit 16; on the other hand, when operation is performed using the above-described zoom adjustment button to move the zoom position of the projection lens 28 to the telephoto side, the CPU 6 controls the three-dimensional correction unit 5 to cause the three-dimensional interpolation processor 15 to refer to the correction data Cc in register 18 among the registers 17 and 18 of the correction data storage unit 16.

Other than the above, the configuration of this liquid crystal projector is the same as the liquid crystal projector of FIG. 5.

Next, operation of this liquid crystal projector is explained.

When a user operates the above-described zoom adjustment button, the zoom position of the projection lens 28 is adjusted, under the control of the CPU 6.

When the zoom position of the projection lens 28 is adjusted to the broad-angle side, under the control of the CPU 6, three-dimensional interpolation data C(X, Y, Z) obtained based on the correction data Cc (correction data to compensate for color unevenness and brightness unevenness in the state in which the zoom position of the projection lens 28 is on the broad-angle side) in the register 17 of the correction data storage unit 16 is supplied to the white balance adjustment unit 3 and gamma correction unit 4 from the three-dimensional correction unit 5, with. By this means, uniformity correction (white balance adjustment and gamma correction) of the image signal applied to the liquid crystal element 25 are performed in the white balance adjustment unit 3 and gamma correction unit 4 so as to compensate for color unevenness and brightness unevenness in the state in which the zoom position of the projection lens 28 is on the broad-angle side.

On the other hand, when the zoom position of the projection lens 28 is adjusted to the telephoto side, under the control of the CPU 6, three-dimensional interpolation data C(X, Y, Z) obtained based on the correction data Cc (correction data to compensate for color unevenness and brightness unevenness in the state in which the zoom position of the projection lens 28 is on the telephoto side) in the register 18 of the correction data storage unit 16 is supplied to the white balance adjustment unit 3 and gamma correction unit 4 from the three-dimensional correction unit 5. By this means, uniformity correction (white balance adjustment and gamma correction) of the image signal applied to the liquid crystal element 25 are performed in the white balance adjustment unit 3 and gamma correction unit 4 so as to compensate for color unevenness and brightness unevenness in the state in which the zoom position of the projection lens 28 is on the telephoto side.

Thus by performing different correction on the image signal even at the same level in the same location of the picture plane of the liquid crystal element 25, according to the zoom position of the projection lens 28, appropriate uniformity correction can be performed even when there is a change, due to the zoom position of the projection lens 28, in the angular distribution of light emitted from the liquid crystal element 25 and reaching the screen.

Further, registers 17 and 18 are provided in the data storage unit 16 of the three-dimensional correction unit 5 to store two sets of correction data Cc corresponding to the characteristic of each area in the picture plane of the liquid crystal element 25, according to the zoom position of the projection lens 28; hence appropriate uniformity correction can be performed, according to the zoom position of the projection lens 28, more quickly than when computing the correction data Cc according to the zoom position of the projection lens 28.

Further, the CPU 6 can judge the current zoom position of the projection lens 28 and perform correction according to the f number at the current zoom position of the projection lens 28 based on the judgment result, so that appropriate uniformity correction can be performed automatically according to changes in the zoom position of the projection lens 28.

Figure 9:
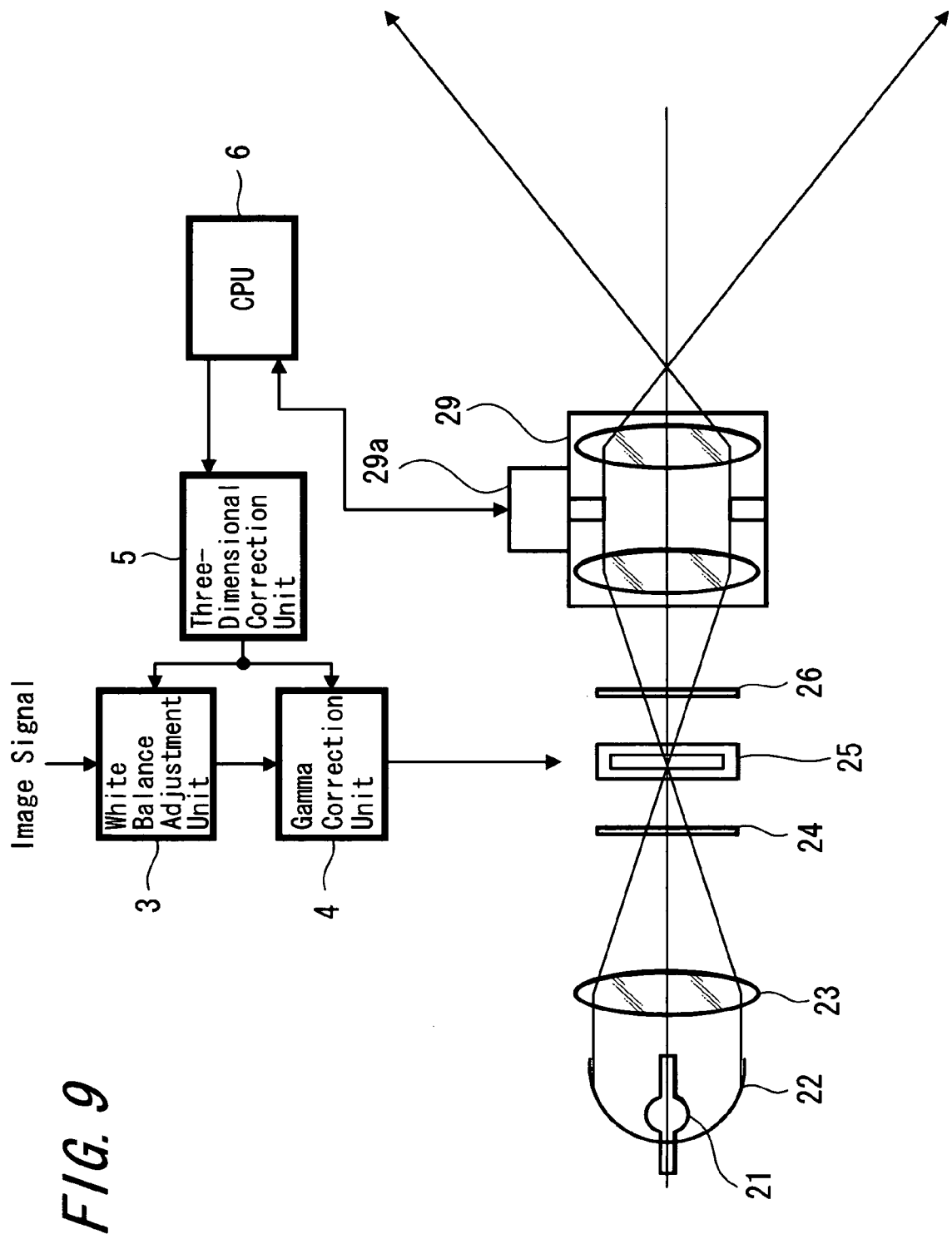
FIG. 9 shows an example of the configuration of another liquid crystal projector to which this invention is applied.

Next, FIG. 9 shows an example of the configuration of another liquid crystal projector to which this invention is applied; units common to FIGS. 1, 5 and 6 are assigned the same symbols. This liquid crystal projector is not provided with a variable diaphragm, but as the projection lens, two projection lenses, with f numbers of 1.85 and of 2.2, can be used replaceably. The angular distribution of light emitted from the liquid crystal element 25 and reaching the screen changes according to the f number of the mounted projection lens.

As a projection lens mounted in this liquid crystal projector, a lens provided with an f number notification unit 29a, shown as the projection lens 29 in the drawing, is used. The f number notification unit 29a notifies the CPU 6 of the liquid crystal projector of its own f number (1.85 or 2.2); and by mounting the projection lens 29 on the liquid crystal projector, data indicating the f number is stored in memory (for example ROM) connected to the CPU 6. By reading data from this memory, the CPU 6 determines the f number of the mounted projection lens. (In another example, the f number notification unit 29a includes a protrusion, provided at different positions on the projection lens 29, according to whether the f number is 1.85 or 2.2, and the liquid crystal projector is provided with means of detecting the position of this protrusion when a projection lens 29 is mounted; the CPU 6 thus determines the f number of the projection lens 29 using this detection result.)

At the time of adjustment of the liquid crystal projector at the factory, the color unevenness and brightness unevenness of a projected image when a projection lens with an f number of 1.85 is mounted and the color unevenness and brightness unevenness of a projected image when a projection lens with an f number of 2.2 is mounted, are measured; correction data Cc to compensate for color unevenness and brightness unevenness when the projection lens with an f number of 1.85 is mounted (according to the incident angular distribution when light to be projected from the projection lens when the projection lens with an f number of 1.85 is mounted is incident on the liquid crystal element 25, and according to the VT curve characteristics of different areas of the picture plane of the liquid crystal element 25) is stored in the register 17 (FIG. 6) of the correction data storage unit 16 of the three-dimensional correction unit 5; and correction data Cc to compensate for color unevenness and brightness unevenness when the projection lens with an f number of 2.2 is mounted (according to the incident angular distribution when light to be projected from the projection lens when the projection lens with an f number of 2.2 is mounted is incident on the liquid crystal element 25, and according to the VT curve characteristics of different areas of the picture plane of the liquid crystal element 25) is stored in the register 18.

When the f number of the projection lens 29 is judged to be 1.85 using the f number notification unit 29a of the mounted projection lens 29, the CPU 6 controls the three-dimensional correction unit 5 to cause the three-dimensional interpolation processor 15 to refer to the correction data Cc in the register 17 among the registers 17 and 18 of the correction data storage unit 16, and on the other hand, when the f number of the projection lens 29 is judged to be 2.2 using the f number notification unit 29a of the mounted projection lens 29, the CPU 6 controls the three-dimensional correction unit 5 to cause the three-dimensional interpolation processor 15 to refer to the correction data Cc in the register 18 among the registers 17 and 18 of the correction data storage unit 16.

Otherwise the configuration of the liquid crystal projector is the same as that of the liquid crystal projector of FIG. 5.

Next, operation of the liquid crystal projector is explained.

When the user mounts the projection lens 29 with an f number of 1.85 onto the liquid crystal projector, the CPU 6 uses the f number notification unit 29a to judge that the f number of the mounted projection lens is 1.85. Then, under control of the CPU 6, three-dimensional interpolation data C(X, Y, Z) obtained based on correction data Cc (correction data to compensate for color unevenness and brightness unevenness when a projection lens with an f number of 1.85 is mounted) within the register 17 of the correction data storage unit 16 is supplied from the three-dimensional correction unit 5 to the white balance adjustment unit 3 and gamma correction unit 4. By this means, uniformity correction (white balance adjustment and gamma correction) are performed on the image signal applied to the liquid crystal element 25, in the white balance adjustment unit 3 and gamma correction unit 4 so as to compensate for color unevenness and brightness unevenness when the projection lens with f number 1.85 is mounted.

On the other hand, when the user mounts the projection lens 29 with an f number of 2.2 onto the liquid crystal projector, the CPU 6 uses the f number notification unit 29a to judge that the f number of the mounted projection lens is 2.2. Then, under control of the CPU 6, three-dimensional interpolation data C(X, Y, Z) obtained based on correction data Cc (correction data to compensate for color unevenness and brightness unevenness when a projection lens with an f number of 2.2 is mounted) within the register 18 of the correction data storage unit 16 is supplied from the three-dimensional correction unit 5 to the white balance adjustment unit 3 and gamma correction unit 4. By this means, uniformity correction (white balance adjustment and gamma correction) are performed on the image signal applied to the liquid crystal element 25 in the white balance adjustment unit 3 and gamma correction unit 4 so as to compensate for color unevenness and brightness unevenness when the projection lens with f number 2.2 is mounted.

Thus by performing different correction according to the f number of the mounted projection lens even for image signals at the same level and in the same location of the picture plane of the liquid crystal element 25, appropriate uniformity correction can be performed even when there is a change in the angular distribution of light emitted from the liquid crystal element 25 and reaching the screen due to the f number of the mounted projection lens.

Further, registers 17 and 18 are provided in the correction data storage unit 16 of the three-dimensional correction unit 5 to store two sets of correction data Cc for the characteristics of each area of the picture plane of the liquid crystal element 25, according to the f number of the replaceable projection lens. Hence appropriate uniformity correction according to the f number of the mounted projection lens can be performed more quickly than when using computation to determine the correction data Cc according to the zoom position of the currently mounted projection lens.

Furthermore, the CPU 6 judges the f number of the currently mounted projection lens, and correction is performed according to the f number of the currently mounted projection lens based on the judgment result; hence appropriate uniformity correction can be performed automatically according to the f number of the mounted projection lens.

Figure 10:
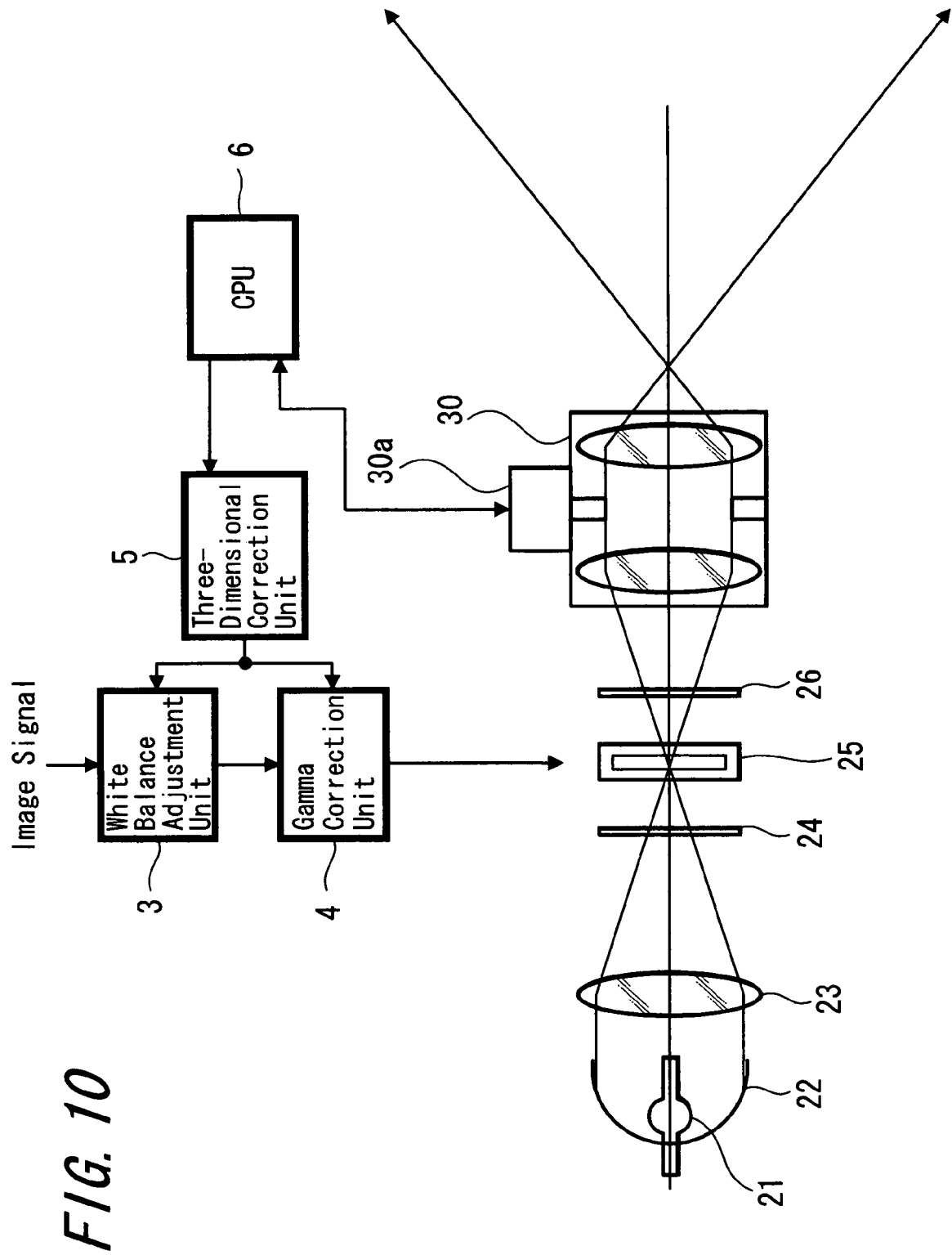
FIG. 10 shows a modified example of the liquid crystal projector of FIG. 9.

Next, FIG. 10 shows a modified example of the configuration of the liquid crystal projector of FIG. 9; units common to FIGS. 1, 5, 6, and 9 are assigned the same symbols. The projection lens 30 with an f number of 2.2 shown in the drawing and used as a projection lens to be mounted on this liquid crystal projector is provided with a differential data storage unit 30a (as the projection lens with an f number of 1.85, an ordinary projection lens not provided with a differential data storage unit 30a is used).

The differential data storage unit 30a is configured such that, upon mounting the projection lens 30 on the liquid crystal projector, data which is the difference of the correction data Cc stored in register 18 (FIG. 6) of the correction data storage unit 16 of the three-dimensional correction unit 5 (correction data to compensate for color unevenness and brightness unevenness when a projection lens with an f number of 2.2 is mounted) and the correction data Cc stored in the register 17 (FIG. 6) of the correction data storage unit 16 of the three-dimensional correction unit 5 (correction data to compensate for color unevenness and brightness unevenness when a projection lens with an f number of 1.85 is mounted) in the example of FIG. 9, is stored in memory (for example ROM) connected to the CPU 6.

Though not shown, in this example the correction data storage unit 16 of the three-dimensional correction unit 5 is provided with only a register (equivalent to the register 17 in FIG. 6) which stores correction data Cc to compensate for color unevenness and brightness unevenness when a projection lens with an f number of 1.85 is mounted; a register (equivalent to the register 18 in FIG. 6) which stores correction data Cc to compensate for color unevenness and brightness unevenness when a projection lens with an f number of 2.2 is mounted, is not provided.

When there exists no differential data storage unit 30a in the mounted projection lens (when the f number of the mounted projection lens is 1.85), the CPU 6 causes the three-dimensional interpolation processor 15 to refer to the correction data Cc in the register of the correction data storage unit 16, and based on this correction data Cc causes the three-dimensional correction unit 5 to prepare three-dimensional interpolation data C(X, Y, Z).

On the other hand, when there exists a differential data storage unit 30a in the mounted projection lens (when the f number of the mounted projection lens is 2.2), the differential data is read from the differential data storage unit 30a, and the CPU 6 causes the three-dimensional interpolation processor 15 to refer to this differential data and the correction data Cc in the register of the correction data storage unit 16, and based on the data resulting by subtraction of this differential data from the correction data Cc, causes the three-dimensional correction unit 5 to prepare three-dimensional interpolation data C(X, Y, Z).

Otherwise the configuration of this liquid crystal projector is the same as in the example of FIG. 9.

In this example, it is sufficient to store only correction data Cc corresponding to a projection lens of f number serving as a standard (an f number of 1.85) in the correction data storage unit 16 of the three-dimensional correction unit 5. As a result, in addition to obtaining completely the same advantageous results as in the example of FIG. 9, appropriate uniformity correction can be performed corresponding to replacement of the projection lens, even when there are numerous types of replaceable projection lenses (here there are only two types of projection lenses, with f numbers of 1.85 and 2.2, but cases of three or more types can be accommodated), without causing numerous correction data sets to be stored in the correction data storage unit 16 of the three-dimensional correction unit 5 of the liquid crystal projector main unit.

In addition to the f number, optical characteristics specific to the projection lens, such as for example differential data including correction of light amount distribution due to the angle of field of the projection lens, can also be stored in the differential data storage unit 30a of the projection lens. Accordingly, the liquid crystal projector main unit can perform appropriate uniformity correction according to the optical characteristics of individual replaceable projection lenses.

In the above-described example, a configuration is employed in which differential data is stored in the storage means of a replaceable projection lens; through the storage means of the projection lens, correction data corresponding to individual projection lenses can be stored, and based on the correction data, various configurations can be employed in which, the liquid crystal projector main unit can perform appropriate uniformity correction according to replacement of the projection lens.

In each of the above examples, a liquid crystal projector provided with a variable diaphragm, a liquid crystal projector having a projection lens including a zoom lens, and a liquid crystal projector with a replaceable zoom lens were described separately. However, this invention may also be applied to a liquid crystal projector provided with a variable diaphragm and also having a projection lens including a zoom lens, and to a liquid crystal projector provided with a variable diaphragm and with a replaceable zoom lens (with appropriate uniformity correction performed according to the combination of the currently open or closed state of the variable diaphragm and the current zoom position, or with appropriate uniformity correction performed according to the combination of the currently open or closed state of the variable diaphragm and the f number of the currently mounted projection lens).

Further, in the above examples, correction of the image signal applied to the liquid crystal element 25 is performed according to the two stages, which are the open and closed states, of the variable diaphragm 1 (two-stage adjustment of the area of the aperture portion to be large or small). However, in another example, correction of the image signal applied to the liquid crystal element 25 may be performed according to three or more stages of open or closed states of the variable diaphragm 1.

In the above examples, this invention is applied to a liquid crystal projector; however, this invention may be applied to other projection-type display devices as well. For example, when providing a DMD® projector with a variable diaphragm, the variable diaphragm may be provided within the projection lens.

In the example of FIG. 5 above, a variable diaphragm 1 (mechanical shutter) is used as shielding means. However, in other examples, a liquid crystal shutter composed of a transmissive liquid crystal element may be used as shielding means.

Further, this invention is not limited to the above examples, and of course various other configurations may be employed, so long as there is no deviation from the gist of the invention.

As explained above, by means of a first projection-type display device of this invention, in an environment with outside light the shielding amount of the shielding means can be reduced, to make white brighter and present a higher-brightness image, whereas in an environment without outside light the shielding amount of the shielding means can be increased, to suppress white and enhance contrast, with the advantageous result that a balance between brightness and contrast can be achieved.

Furthermore, while maintaining a balance between brightness and contrast, there is the advantageous result that appropriate uniformity correction can be performed even when there is a change in the angular distribution of light emitted from the spatial light modulation element and reaching the screen, due to a change in the amount of shielding of the shielding means.

Moreover, there is also the advantageous result that appropriate uniformity correction can be performed even when the output level characteristic of light from the spatial light modulation element with respect to the image signal applied level is different for different areas of the spatial light modulation element, and also changes due to the angular distribution of light incident on the spatial light modulation element.

Then, there is a further advantageous result that, according to the second projection-type display device of this invention, appropriate uniformity correction can be performed even when there is a change in the angular distribution of light emitted from the spatial light modulation element and reaching the screen due to a change in the zoom position of the projection lens.

Further, there is the advantageous result that appropriate uniformity correction can be performed even when the output level characteristic of light from the spatial light modulation element with respect to the image signal application level is different for different areas of the spatial light modulation element, and also changes due to the angular distribution of light incident on the spatial light modulation element.

There is also the advantageous result that appropriate uniformity correction according to the zoom position of the projection lens can be performed more quickly than when using computation to determine the correction data corresponding to the current zoom position of the projection lens.

Further, there is the advantageous result that appropriate uniformity correction according to the zoom position of the projection lens can be performed automatically.

Furthermore, according to the third projection-type display device of this invention, there is the advantageous result that appropriate uniformity correction can be performed even when there is a change in the angular distribution of light emitted from the spatial light modulation element and reaching the screen due to replacement of the projection lens with a projection lens having a different f number.

Further, there is the advantageous result that appropriate uniformity correction can be performed even when the output level characteristic of light from the spatial light modulation element with respect to the image signal application level is different for different areas of the spatial light modulation element, and also changes due to changes in the angular distribution of light incident on the spatial light modulation element.

Further, there is the advantageous result that appropriate uniformity correction according to replacement of the projection lens can be performed more quickly than when using computation to determine correction data according to the f number of the currently mounted projection lens.

Furthermore, there is also the advantageous result that appropriate uniformity correction can be performed automatically according to replacement of the projection lens.

Moreover, there is also the advantageous result that appropriate uniformity correction can be performed according to replacement of the projection lens without storing numerous correction data sets in the projection-type display device main unit, even when there are numerous replaceable projection lenses.

The invention claimed is:

1. A projection-type display device, comprising:
a light source;
a spatial light modulation element that modulates incident light according to an applied image signal and that emits the modulated light;
an illumination optical system that condenses light from said light source and that illuminates said spatial light modulation element;
a projection lens that projects light emitted from said spatial light modulation element;
shielding means that is positioned along a path of light on a side of either said illumination optical system or said projection lens with respect to said spatial light modulation element and that varies an amount of shielding of transmitted light; and image signal correction means that divides a picture plane of said spatial light modulation element into a plurality of areas and that performs a three-dimensional correction on said image signal applied to said spatial light modulation element in accordance with a current shielding amount of said shielding means for each of said plurality of areas;

wherein the three-dimensional correction includes a white balance adjustment and a gamma correction.

2. The projection-type display device according to claim 1, wherein said image signal correction means performs said three-dimensional correction for each of said plurality of areas in accordance with an output level characteristic of light in each area with respect to an application level of said applied image signal and in accordance with the current shielding amount of said shielding means.

3. The projection-type display device according to claim 1, further comprising:

storage means that stores a plurality of correction data sets in accordance with the current shielding amount of said shielding means, wherein said image signal correction means performs said three-dimensional correction, referring to the correction data in accordance with the current shielding amount of said shielding means in said storage means.

4. The projection-type display device according to claim 2, further comprising:

storage means that stores a plurality of correction data sets in accordance with the current shielding amount of said shielding means, wherein said image signal correction means performs said three-dimensional correction, referring to the correction data, in accordance with the current shielding amount of said shielding means in said storage means.

* * * * *